United States Patent
Cash et al.

(10) Patent No.: US 11,879,982 B2
(45) Date of Patent: Jan. 23, 2024

(54) MOBILE REFERENCE STATION FOR GNSS POSITIONING

(71) Applicant: Trimble Inc., Sunnyvale, CA (US)

(72) Inventors: Michael Cash, Mountain View, CA (US); Stuart Riley, San Jose, CA (US); Vivek Nadkarni, Sunnyvale, CA (US)

(73) Assignee: Trimble Inc., Sunnyvale, CA (US)

( * ) Notice: Subject to any disclaimer, the term of this patent is extended or adjusted under 35 U.S.C. 154(b) by 295 days.

(21) Appl. No.: 17/142,951

(22) Filed: Jan. 6, 2021

(65) Prior Publication Data

US 2021/0124060 A1    Apr. 29, 2021

Related U.S. Application Data

(62) Division of application No. 16/990,811, filed on Aug. 11, 2020, now Pat. No. 10,908,297, which is a
(Continued)

(51) Int. Cl.
*G01S 19/40* (2010.01)
*G01S 19/41* (2010.01)
(Continued)

(52) U.S. Cl.
CPC .............. *G01S 19/40* (2013.01); *G01S 19/07* (2013.01); *G01S 19/071* (2019.08); *G01S 19/41* (2013.01); *G01S 19/43* (2013.01); *G01S 19/04* (2013.01)

(58) Field of Classification Search
CPC .......... G01S 19/04; G01S 19/40; G01S 19/41; G01S 19/43; G01S 19/071; G01S 19/07
(Continued)

(56) References Cited

U.S. PATENT DOCUMENTS

| | | | |
|---|---|---|---|
| 5,523,761 A * | 6/1996 | Gildea | .............. G01S 19/36 29/722 |
| 6,100,842 A | 8/2000 | Dreier et al. | |

(Continued)

FOREIGN PATENT DOCUMENTS

| | | |
|---|---|---|
| JP | H09-61509 A | 7/1997 |
| WO | 2018/022710 A1 | 2/2018 |

OTHER PUBLICATIONS

El-Hallaq, Dr. M., et al., "Surveying Errors and Adjustment, A short Training Course", The Islamic University of Gaza, Apr. 2011, 38 pages.
(Continued)

*Primary Examiner* — Vladimir Magloire
*Assistant Examiner* — Michael W Justice
(74) *Attorney, Agent, or Firm* — Kilpatrick Townsend & Stockton LLP

(57) ABSTRACT

Methods for determining corrected positions of a global navigation satellite system (GNSS) rover using a GNSS base station and one or more GNSS reference stations include determining a statistical representation of position measurements from the GNSS reference stations and an instantaneous position measurement from the GNSS reference stations. A position correction is determined based on the statistical representation and the instantaneous position measurement. A corrected position of the GNSS rover is determined based on a position of the GNSS rover and the position correction.

7 Claims, 9 Drawing Sheets

Related U.S. Application Data division of application No. 15/223,877, filed on Jul. 29, 2016, now Pat. No. 10,782,417.

(51) Int. Cl.
*G01S 19/07* (2010.01)
*G01S 19/43* (2010.01)
*G01S 19/04* (2010.01)

(58) Field of Classification Search
USPC ............ 342/357.23, 357.44, 357.24, 357.31
See application file for complete search history.

(56) References Cited

U.S. PATENT DOCUMENTS

| | | | | |
|---|---|---|---|---|
| 6,140,959 | A * | 10/2000 | Gudat | G01S 19/071 |
| | | | | 342/357.62 |
| 6,531,981 | B1 | 3/2003 | Fuller et al. | |
| 6,799,116 | B2 | 9/2004 | Robbins | |
| 7,340,343 | B2 * | 3/2008 | Petrovski | G01S 19/44 |
| | | | | 701/470 |
| 7,653,399 | B2 * | 1/2010 | Lawrence | G01S 19/073 |
| | | | | 455/456.1 |
| 8,768,344 | B2 * | 7/2014 | Naguib | G01S 5/021 |
| | | | | 455/67.11 |
| 8,831,594 | B2 * | 9/2014 | Naguib | H04W 24/04 |
| | | | | 455/67.11 |
| 8,983,685 | B2 * | 3/2015 | Dai | G01S 5/0072 |
| | | | | 701/484 |
| 9,002,349 | B2 * | 4/2015 | Naguib | G01S 5/021 |
| | | | | 455/67.11 |
| 9,191,897 | B2 * | 11/2015 | Morrison | G01S 19/34 |
| 9,494,693 | B2 * | 11/2016 | Hernández-Pajares | |
| | | | | G01S 19/44 |
| 9,798,017 | B2 * | 10/2017 | Zhodzishsky | G01S 19/44 |
| 10,782,417 | B2 | 9/2020 | Cash et al. | |
| 10,908,297 | B2 | 2/2021 | Cash et al. | |
| 2005/0080563 | A1 * | 4/2005 | Petrovski | G01S 19/11 |
| | | | | 701/470 |
| 2007/0149209 | A1 * | 6/2007 | Lawrence | G01S 19/073 |
| | | | | 342/357.44 |
| 2007/0180716 | A1 | 8/2007 | Hertzman | |
| 2009/0121927 | A1 * | 5/2009 | Moshfeghi | G01S 19/22 |
| | | | | 342/357.44 |
| 2010/0159958 | A1 * | 6/2010 | Naguib | G01S 5/021 |
| | | | | 455/457 |
| 2010/0166044 | A1 | 7/2010 | Offer | |
| 2011/0024559 | A1 | 2/2011 | McGeer et al. | |
| 2011/0231061 | A1 | 9/2011 | Reeve et al. | |
| 2012/0050095 | A1 | 3/2012 | Scherzinger et al. | |
| 2013/0072228 | A1 * | 3/2013 | Naguib | H04W 24/04 |
| | | | | 455/456.1 |
| 2014/0018065 | A1 * | 1/2014 | Naguib | H04W 24/04 |
| | | | | 455/424 |
| 2014/0070992 | A1 * | 3/2014 | Hernandez-Pajares | |
| | | | | G01S 19/02 |
| | | | | 342/357.68 |
| 2014/0286213 | A1 * | 9/2014 | Morrison | H04W 52/0261 |
| | | | | 370/311 |
| 2016/0146942 | A1 | 5/2016 | McDonald et al. | |
| 2017/0254904 | A1 * | 9/2017 | Zhodzishsky | G01S 19/04 |
| 2018/0284293 | A1 | 10/2018 | Pan | |
| 2019/0317224 | A1 | 10/2019 | Miya et al. | |

OTHER PUBLICATIONS

Lightbody, S., et al., "White Paper: Techniques in Relative RTK GNSS Positioning", Trimble®, 2010, 6 pages.

Euler, H.J., "Reference Station Network Information Distribution", Dec. 3, 2005, pp. 1-6, retrieved from the internet at http://www.wasoft.de/e/iagwg451/euler/euler.html.

Partial International Search Report for Application No. PCT/US2017/043879, dated Oct. 26, 2017, 11 pages.

International Search Report and Written Opinion for Application No. PCT/US2017/043879 dated Jan. 4, 2018, 19 pages.

Extended European Search Report for Application No. 19208923.3-1206, dated Apr. 20, 2020, 8 pages.

Wanninger, L. et al., "Controlled Antenna Changes at GNSS Reference Stations," 22nd International Meeting of the Satellite Division of the Institute of Navigation, Savannah, GA, Sep. 22-25, 2009, pp. 649-657.

U.S. Appl. No. 15/223,877 First Action Interview Pilot Program Pre-Interview Communication dated Mar. 13, 2019, 9 pages.

U.S. Appl. No. 15/223,877 First Action Interview Office Action Summary dated May 8, 2019, 6 pages.

U.S. Appl. No. 15/223,877 Final Office Action dated Sep. 12, 2019, 16 pages.

U.S. Appl. No. 15/223,877 Non-Final Office Action dated Jan. 17, 2020, 15 pages.

U.S. Appl. No. 15/223,877 Notice of Allowance dated Jun. 15, 2020, 5 pages.

U.S. Appl. No. 16/990,811 Notice of Allowance dated Sep. 29, 2020, 16 pages.

\* cited by examiner

MOBILE REFERENCE STATION FOR GNSS POSITIONING

CROSS-REFERENCES TO RELATED APPLICATIONS

The present application is a divisional of U.S. application Ser. No. 16/990,811, filed Aug. 11, 2020, which is a divisional of U.S. application Ser. No. 15/223,877, filed Jul. 29, 2016, the entire contents of which are incorporated by reference herein for all purposes.

FIELD OF THE INVENTION

Embodiments described herein relate generally to global navigation satellite system (GNSS) positioning, and more specifically, to determining vertical corrections for GNSS position measurements.

BACKGROUND

Differential GNSS techniques improve positioning accuracy by using base stations to determine corrections. The corrections are based on differences between positions determined using satellite signals and known locations. One example of a differential GNSS technique is the differential global positioning system (DGPS). DGPS base stations are located at known locations and track GNSS satellites to measure their pseudoranges. The DGPS base stations also calculate what the pseudoranges should be based on their known locations. Corrections are generated based on the differences. The corrections are sent to rovers where they are used to improve positioning accuracy.

Another differential GNSS method is the real-time kinematic (RTK) technique. As with DGPS, the RTK technique utilizes base stations at known locations. The RTK base stations collect data from satellites and determine measurement errors. RTK corrections are broadcast to rovers where they are combined with local position measurements to estimate carrier phase ambiguities. RTK is different from DGPS in that RTK utilizes carrier phase, rather than pseudorange, to more precisely determine the distance from each GNSS satellite to the base station (or base station receiver).

Rovers using RTK corrections from a single base station are generally limited to a range of about 70 km from the base station due to changes in propagation delay of satellite signals. This is because the ionosphere is typically not homogenous in electron density and because the electron density often changes throughout the day based on the position of the sun and other factors. As a result, RTK corrections become less accurate as the distance between the base station and rover increases because differences in electron density become more significant.

Oftentimes the the vertical component (or elevation) of GNSS position measurements is most susceptible to errors, and as the distance between the base station and rover increases, this susceptibility can increase. Thus, improvements are constantly sought to improve position measurements and particularly vertical position accuracy.

SUMMARY

Embodiments described herein improve position measurements and especially vertical position accuracy. In an embodiment, for example, one or more GNSS reference stations are used, along with a GNSS base station, to determine position corrections. In some embodiments the position corrections are vertical corrections. GNSS rovers can use the corrections, along with conventional differential GNSS techniques, to improve position measurement accuracy.

In accordance with an embodiment, a method for determining corrected positions of a GNSS rover using a GNSS base station and a GNSS reference station includes arranging the GNSS reference station at a first location and determining a first average position of the GNSS reference station at the first location using corrections received from the GNSS base station and signals received from GNSS satellites. A first instantaneous position of the GNSS reference station is determined at the first location using corrections received from the GNSS base station and signals received from GNSS satellites. A first position of the GNSS rover is determined using corrections received from the GNSS base station and signals received from GNSS satellites. A first vertical correction is determined based on the first average position and the first instantaneous position. A first corrected position of the GNSS rover is determined based on the first position of the GNSS rover and the first vertical correction. Thereafter, the GNSS reference station is arranged at a second location different from the first location. A second average position of the GNSS reference station is determined at the second location using corrections received from the GNSS base station and signals received from GNSS satellites. A second instantaneous position of the GNSS reference station is determined at the second location using corrections received from the GNSS base station and signals received from GNSS satellites. A second position of the GNSS rover is determined using corrections received from the GNSS base station and signals received from GNSS satellites. A second vertical correction is determined based on the second average position and the second instantaneous position. A second corrected position of the GNSS rover is determined based on the second position of the GNSS rover and the second vertical correction.

In an embodiment, each of the GNSS rover, the GNSS base station, and the GNSS reference station are configured for RTK processing techniques.

In another embodiment, the first and second corrected positions of the GNSS rover are also based on a scaling factor that is a function of a first distance between the GNSS rover and the GNSS reference station and a second distance between the GNSS rover and the GNSS base station.

In another embodiment, the first average position is determined from a plurality of first position measurements at the first location, and the second average position is determined from a plurality of second position measurements at the second location.

In another embodiment, the first instantaneous position is a single position measurement determined after a plurality of other position measurements that are used in determining the first average position, and the second instantaneous position is a single position measurement determined after a plurality of other position measurements that are used in determining the second average position.

In another embodiment, the first vertical correction is a vertical difference between the first average position and the first instantaneous position, and the second vertical correction is a vertical distance between the second average position and the second instantaneous position.

In yet another embodiment, the first instantaneous position is a most recent one of a plurality of position measurements used to determine the first average position, and the second instantaneous position is a most recent one of a plurality of position measurements used to determine the second average position.

In accordance with another embodiment, a method for determining a corrected position of a GNSS rover using a GNSS base station and a GNSS reference station includes determining a first position of the GNSS reference station using first corrections received from the GNSS base station and first signals received from GNSS satellites. The first position of the GNSS reference station is sent to the GNSS rover. A second position of the GNSS reference station is determined using second corrections received from the GNSS base station and second signals received from the GNSS satellites. The GNSS reference station may remain stationary while the first and second positions of the GNSS reference station are determined. The second position of the GNSS reference station is sent to the GNSS rover. A first position of the GNSS rover is determined using third corrections received from the GNSS base station and third signals received from the GNSS satellites. A vertical correction is determined based on the first and second positions of the GNSS reference station. The corrected position of the GNSS rover are determined based on the first position of the GNSS rover and the vertical correction.

In some embodiments, the GNSS rover, the GNSS base station, and the GNSS reference station are each configured for differential processing techniques, and the first, second, and third corrections received from the GNSS base station are differential corrections. For example, the GNSS rover, the GNSS base station, and the GNSS reference station may be configured for RTK processing techniques, and the first, second, and third corrections received from the GNSS base station may be RTK corrections.

In an embodiment, the first and second positions of the GNSS reference station are sent to the GNSS rover using wireless communications.

In another embodiment, the first position of the GNSS reference station is combined with other positions of the GNSS reference station to obtain an average position of the GNSS reference station, and the vertical correction is a vertical difference between the average position of the GNSS reference station and the second position of the GNSS reference station.

In another embodiment, the first, second, and third corrections are determined based on the fixed position of the GNSS base station and signals received at the GNSS base station from the GNSS satellites.

In yet another embodiment, the GNSS rover is moving while the first and second positions of the GNSS reference station are determined.

In addordance with yet another embodiment, a method for determining corrected positions of a GNSS rover using a GNSS base station and a plurality of GNSS reference stations includes performing a first plurality of position measurements at a first GNSS reference station. The first GNSS reference station is one of the plurality of GNSS reference stations. The first GNSS reference station is arranged at a first location while the first plurality of position measurements are determined. The first plurality of position measurements are determined using corrections received from the GNSS base station and signals received at the first GNSS reference station from GNSS satellites. The first plurality of position measurements may be determined while the first GNSS reference station is stationary. A second plurality of position measurements are performed at a second GNSS reference station different from the first GNSS reference station. The second GNSS reference station is one of the plurality of GNSS reference stations. The second GNSS reference station is arranged at a second location while the second plurality of position measurements are determined. The second plurality of position measurements are determined using corrections received from the GNSS base station and signals received at the second GNSS reference station from GNSS satellites. The second plurality of position measurements may be determined while the second GNSS reference station is stationary. A position of the GNSS rover is determined using corrections received from the GNSS base station and signals received at the GNSS rover from GNSS satellites. A position correction is determined based on the first plurality of position measurements and the second plurality of position measurements. A corrected position of the GNSS rover is determined based on the position of the GNSS rover and the position correction.

In an embodiment, the position correction is a vertical correction that is determined based on a first difference between a statistical representation of the first plurality of position measurements and an instantaneous position of one of the first plurality of position measurements, and a second difference between a statistical representation of the second plurality of position measurements and an instantaneous position of one of the second plurality of position measurements.

In another embodiment, the first plurality of position measurements are determined one at a time and individually sent to the GNSS rover, the second plurality of position measurements are determined one at a time and individually sent to the GNSS rover, and the position correction and the corrected position are determined by the GNSS rover.

In another embodiment, the method also includes determining a third plurality of position measurements of a third GNSS reference station. The third GNSS reference station is one of the plurality of GNSS reference stations. The third GNSS reference station is arranged at a third location while the third plurality of position measurements are determined. The third plurality of position measurements are determined using corrections received from the GNSS base station and signals received at the third GNSS reference station from GNSS satellites. The third plurality of position measurements may be determined while the third GNSS reference station is stationary. The position correction is determined based on the first plurality of position measurements, the second plurality of position measurements, and the third plurality of position measurements.

In yet another embodiment, the position correction is determined based on a first vertical component of the first plurality of position measurements and a second vertical component of the second plurality of position measurements.

Numerous benefits are achieved using embodiments described herein over conventional GNSS techniques. For example, in some embodiments, one or more GNSS reference stations can be used to generate position corrections. These position corrections can be used by a GNSS rover, along with conventional differential GNSS corrections, to improve accuracy of position measurements. The improvement can be especially significant with regard to a vertical component of the position measurements. In other embodiments, the position correction can be scaled based on a distance between the GNSS rover and the one or more GNSS reference stations. The scaling factor diminishes the contribution of the position correction as the distance between the GNSS rover and the one or more GNSS reference stations increases. Depending on the embodiment, one or more of these benefits may exist. These and other benefits are described throughout the specification with reference to the drawings.

DETAILED DESCRIPTION

Embodiments described herein improve position measurement accuracy in differential GNSS systems. They can be particularly useful for improving vertical position measurement accuracy. In an embodiment, for example, a GNSS reference station can be positioned near an area where position measurements will be performed. The GNSS reference station can determine its position using corrections from a GNSS base station and signals received from GNSS satellites. Multiple position measurements taken by the GNSS reference station over a period of time can be used to compute an average position. A difference between the average position and an instantaneous position measurement can be used to determine a position correction. A GNSS rover can use the position correction, along with its own position measurements, to improve position measurement accuracy. The position correction essentially decreases variability caused, for example, by short-term differences in the troposphere and/or ionosphere between the GNSS base station and the GNSS rover, using as a proxy the short-term differences in the troposphere and/or ionosphere between the GNSS base station and the GNSS reference station.

Figure 1:
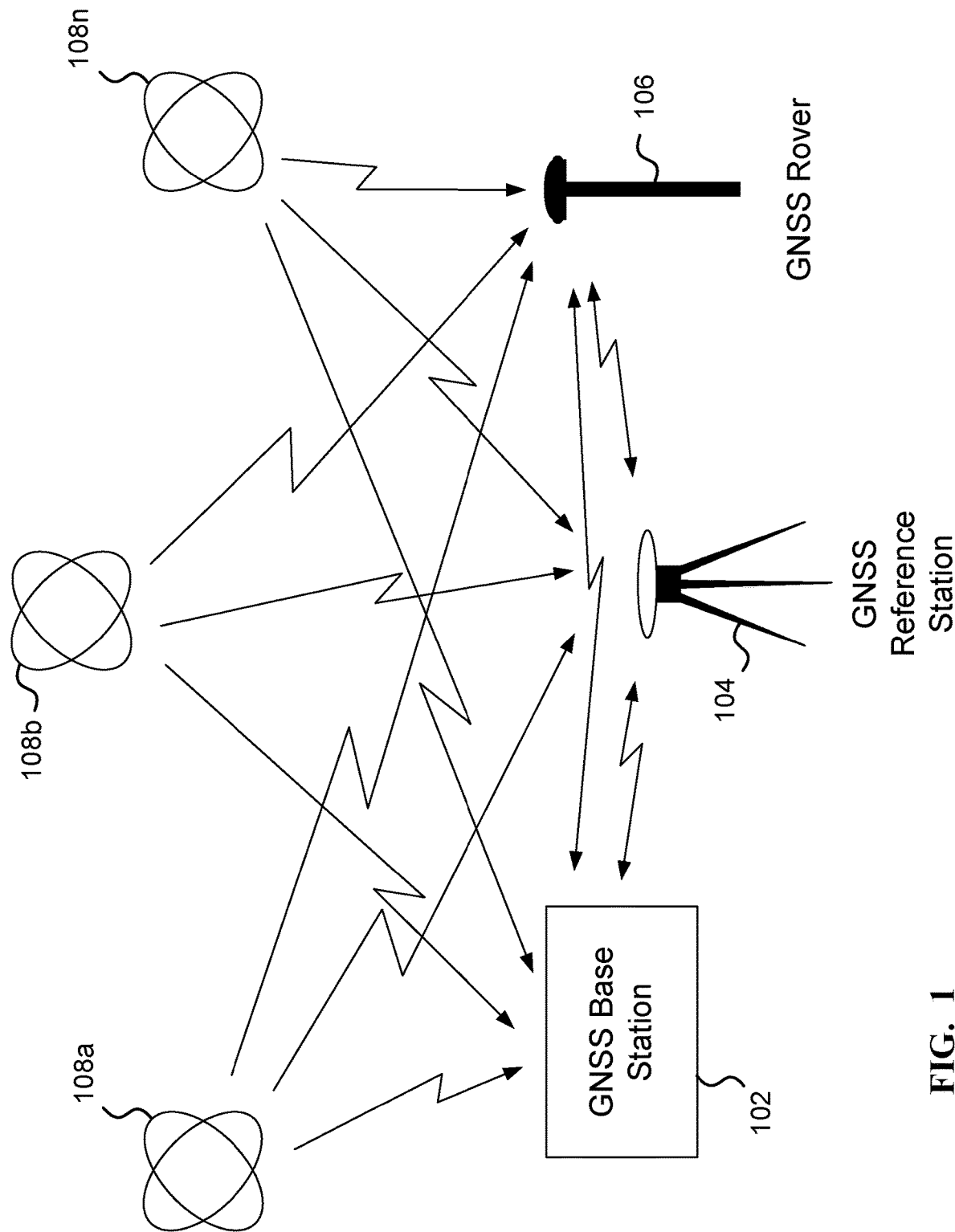
FIG. 1 is a simplified diagram of a differential GNSS system in accordance with some embodiments.

FIG. 1 is a simplified diagram of a differential GNSS system in accordance with some embodiments. The system includes a GNSS base station 102, a GNSS reference station 104, and a GNSS rover 106. Each includes a GNSS receiver that is configured to receive signals from GNSS satellites 108a, 108b, 108n.

The GNSS base station 102 may be a conventional GNSS base station. The GNSS base station 102 typically includes a GNSS receiver that is arranged at a known location. The GNSS base station 102 tracks the GNSS satellites 108a, 108b, 108n and collects data that is used to determine measurement errors. The GNSS satellites 108a, 108b, 108n represent the GNSS satellites that are in view of the GNSS base station 102 and that are used in determining the measurement errors. While only three GNSS satellites 108a, 108b, 108n are shown in FIG. 1, it is to be appreciated that typically more than three GNSS satellites will be in view and used in determining the measurement errors.

The measurement errors are determined using signals from the GNSS satellites 108a, 108b, 108n and the known location of the GNSS base station 102 (or the location of a GNSS receiver associated with the GNSS base station 102). The measurement errors are determined in accordance with known differential GNSS techniques. The accuracy of the measurement errors depend at least in part on the accuracy to which the location of the GNSS base station 102 is known. Because determining a precise location is not trivial, the GNSS base station 102 is typically in a fixed location and is not intended to be moved.

The GNSS base station 102 may be configured to send the measurement errors to the GNSS reference station 104 and the GNSS rover 106 using wired or wireless communications (e.g., radio or cellular). The measurement errors may be referred to as corrections since they can be used by the GNSS reference station 104 and the GNSS rover 106 to correct errors in their position measurements.

In an embodiment, the GNSS base station 102 is configured to generate RTK corrections and send the corrections to the GNSS reference station 104 and the GNSS rover 106 in accordance with known techniques. As explained previously, RTK corrections are determined using carrier phase and enable the GNSS reference station 104 and the GNSS rover 106 to determine precise position measurements. The accuracy of the position measurements decreases as the distance from the GNSS base station 102 increases. Thus, for most RTK applications, the GNSS reference station 104 and the GNSS rover 106 are limited to a range of about 70 km from the GNSS base station 102, although that range may be more or less depending on desired accuracy.

The GNSS reference station 104 and the GNSS rover 106 each include a GNSS receiver that is configured to receive signals from the GNSS satellites 108a, 108b, 108n and use the signals to determine position measurements. The GNSS satellites 108a, 108b, 108n are typically the same satellites that the GNSS base station 102 observed in determining the corrections although there may be some differences in the observable satellites. The GNSS reference station 104 and the GNSS rover 106 are each configured to receive the corrections from the GNSS base station 102 and to use the corrections to improve accuracy of their position measurements.

The GNSS reference station 104 is typically arranged at an unknown location (or a location that does not have previously determined coordinates). Instead, the GNSS reference station 104 uses signals from the GNSS satellites 108a, 108b, 108n and corrections from the GNSS base station 102 to determine its location. Alternatively, the GNSS reference station 104 may be arranged at a known location or the location may be determined using other techniques (e.g., optical surveying). The location is generally near an area where the GNSS rover 106 will be used to determine position measurements. The GNSS reference station 104 is generally mobile and can be moved to different areas so that it remains near the GNSS rover 106. For example, the GNSS reference station 104 may be mounted to a vehicle that can be moved around to different locations. In some embodiments, the GNSS reference station 104 is moved around a measurement area to keep a maximum distance between itself and the GNSS rover 106 to less than some predetermined distance (e.g., 1 km or 500 m).

The GNSS rover 106 is typically mobile and is moved around from location to location while performing position measurements. In some embodiments, the GNSS rover 106 may be mounted on or integrated in a vehicle such as a tractor, earthmover, land-leveling equipment, or the like. In these embodiments, the GNSS rover 106 may be configured to perform position measurements while the vehicle is moving around an area.

The GNSS satellites 108a, 108b, 108n represent those satellites that are in view of the GNSS base station 102, the GNSS reference station 104, and the GNSS rover 106. The GNSS satellites 108a, 108b, 108n are part of a conventional satellite navigation system configured to transmit signals at one or more frequencies in accordance with known techniques. The particular satellites that are in view may change over time as different satellites within a constellation come into view and others move out of view. The remaining figures in this application do not show the GNSS satellites although it is appreciated that they are used to provide signals for position measurements.

The differential GNSS system shown in FIG. 1 may be used to generate position corrections and improve position measurement accuracy of the GNSS rover 106. In some embodiments, for example, the GNSS reference station 104 is configured to determine a plurality of position measurements using corrections from the GNSS base station 102 and signals from the GNSS satellites 108a, 108b, 108n. A statistical representation of the measurements is computed either at the GNSS reference station 104 or at the GNSS rover 106 (e.g., average, median, or the like). The statistical representation may be determined using raw or filtered data. A number of methods may be used to determine the statistical representation. For example, the last N position measurements may be used to determine the statistical representation (e.g., a rolling average). Alternatively, all of the position measurements since a particular time or event may be used to determine the statistical representation (e.g., within the past 12 hours or since the GNSS reference station 104 started tracking the satellites). As yet another example, only position measurements that were obtained before a particular time or event may be used to determine the statistical representation (e.g., at least 15 minutes ago). Combinations of these methods and/or other methods may also be used to determine the statistical representation.

The statistical representation is typically determined while the GNSS reference station 104 is stationary. If the GNSS reference station 104 is moved to a new location, position measurements are performed at the new location and a new statistical representation is determined. The GNSS rover 106 will often be moving while the position measurements are obtained by the GNSS reference station 104.

In some embodiments, the position measurements performed at the GNSS reference station 104 are sent individually or as a stream of data to the GNSS rover 106. The GNSS rover 106 may use the received position measurements to determine the statistical representation. The GNSS rover 106 also uses one or more of the received position measurements as an instantaneous position measurement. For example, the instantaneous position measurement may be a most recently performed position measurement or a most recently received position measurement. Alternatively, the instantaneous position measurement may be a statistical representation of a number of recently performed position measurements or recently received position measurements. The instantaneous position measurement may or may not be included in the statistical representation. The GNSS rover 106 determines a position correction based on the statistical representation of the position measurements and the instantaneous position measurement. For example, the position correction may be a difference between the statistical representation of the position measurements and the instantaneous position measurement. As an example, in some embodiments a position correction (Position_Correction) may be determined based on position measurements from a GNSS reference station using the equation:

$$\text{Position\_Correction} = \text{Statistical\_Representation} - \text{Instantaneous\_Measurement} \quad (1)$$

In other embodiments, the statistical representation may be determined at the GNSS reference station 104 and provided to the GNSS rover 106. For example, the statistical representation may be determined at the GNSS reference station 104 and sent to the GNSS rover 106. Alternatively, the statistical representation may be determined at the GNSS reference station 104 and manually entered at the GNSS rover 106. In any case, the GNSS rover 106 may use the statistical representation, along with an instantaneous position measurement received from the GNSS reference station 104, to determine the position correction as described above.

The GNSS rover 106 can use the position correction, along with its own position measurements, to improve position measurement accuracy. As an example, the GNSS rover can determine its own position in accordance with conventional techniques by using corrections received from the GNSS base station 102 and signals received from the GNSS satellites 108a, 108b, 108n. The GNSS rover 106 may then determine a corrected position based on its own position and the position correction. For example, the GNSS rover 106 may subtract or add the position correction to its own position. As an example, in some embodiments a GNSS rover may determine a corrected position (Corrected_Position) based on its own position (Rover_Position) using the equation:

$$\text{Corrected\_Position} = \text{Rover\_Position} - \text{Position\_Correction} \quad (2)$$

The position correction essentially decreases variability caused, for example, by short-term differences in the troposphere and/or ionosphere between locations of the GNSS base station 102 and the GNSS rover 106. In some embodiments, the position correction may include only one or more components of position (e.g., a vertical component or elevation). In these cases, the position correction is applied only to the corresponding component (e.g., a position correction based on only the vertical component is subtracted or added to the vertical component of the GNSS rover's position).

In some embodiments, the position correction may be scaled (or weighted) based on a number of factors or combinations of factors such as distance between the GNSS rover 106 and the GNSS base station 102, distance between the GNSS rover 106 and the GNSS reference station 104, variability in the position measurements obtained by the GNSS reference station 104, and the like. While any of a number of factors may be used to scale the position correction, in at least some embodiments, a scaling factor (Scaling_Factor) may be determined using the equation:

$$\text{Scaling\_Factor} = \text{Distance}_{R \to BS} / (\text{Distance}_{R \to BS} + \text{Distance}_{R \to RS}) \quad (3)$$

where $\text{Distance}_{R \to BS}$ is the distance between the GNSS rover and the GNSS base station, and $\text{Distance}_{R \to RS}$ is the distance between the GNSS rover and the GNSS reference station. Embodiments that use a scaling factor may determine a corrected position using the equation:

$$\text{Corrected\_Position} = \text{Rover\_Position} - (\text{Position\_Correction} * \text{Scaling\_Factor}) \quad (4)$$

Figure 2A:
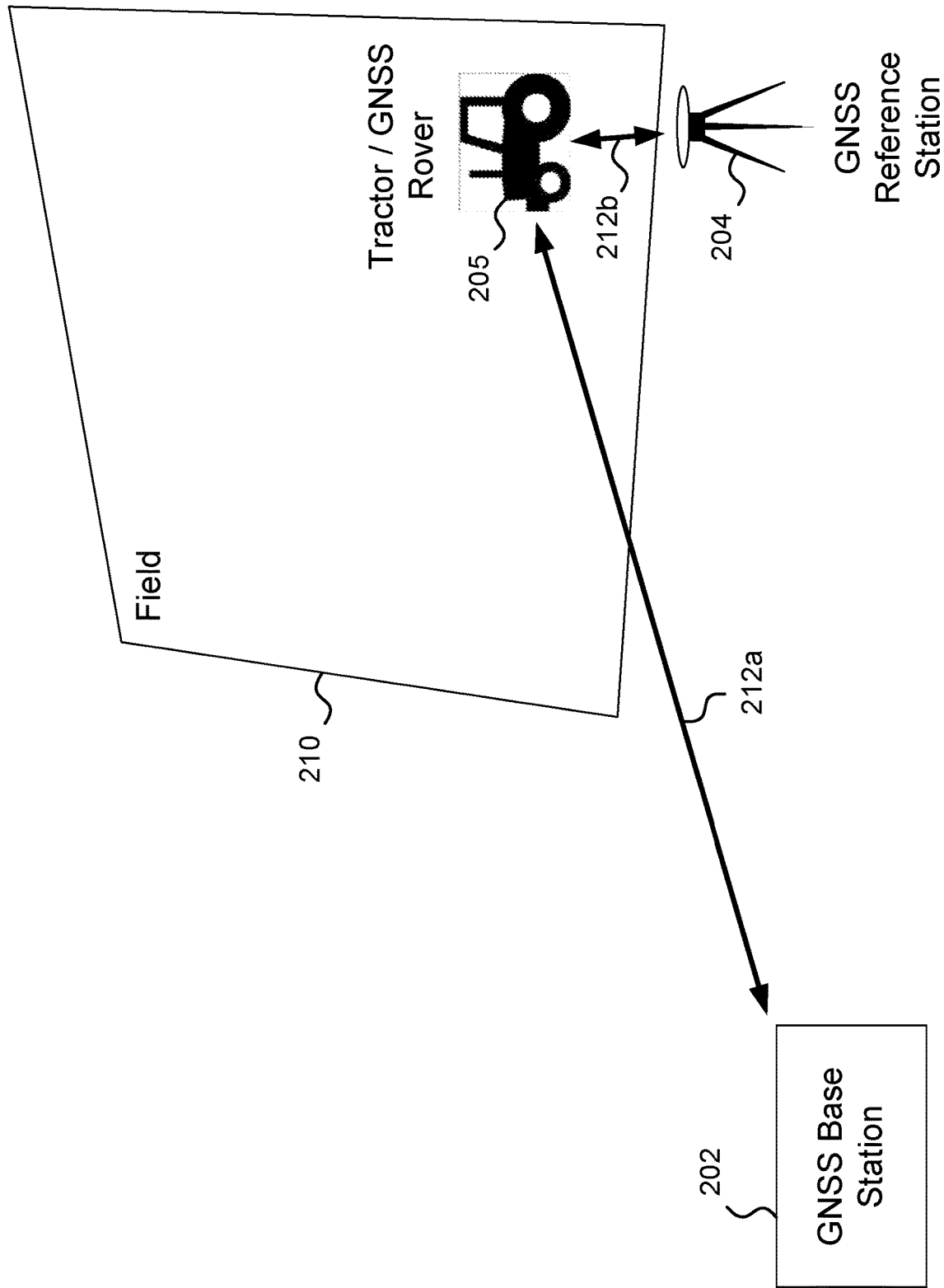
FIGS. 2A-2B, 3, and 4A-4C are simplified diagrams of differential GNSS systems that can be used to determine corrected positions of GNSS rovers in accordance with some embodiments.
Figure 2B:
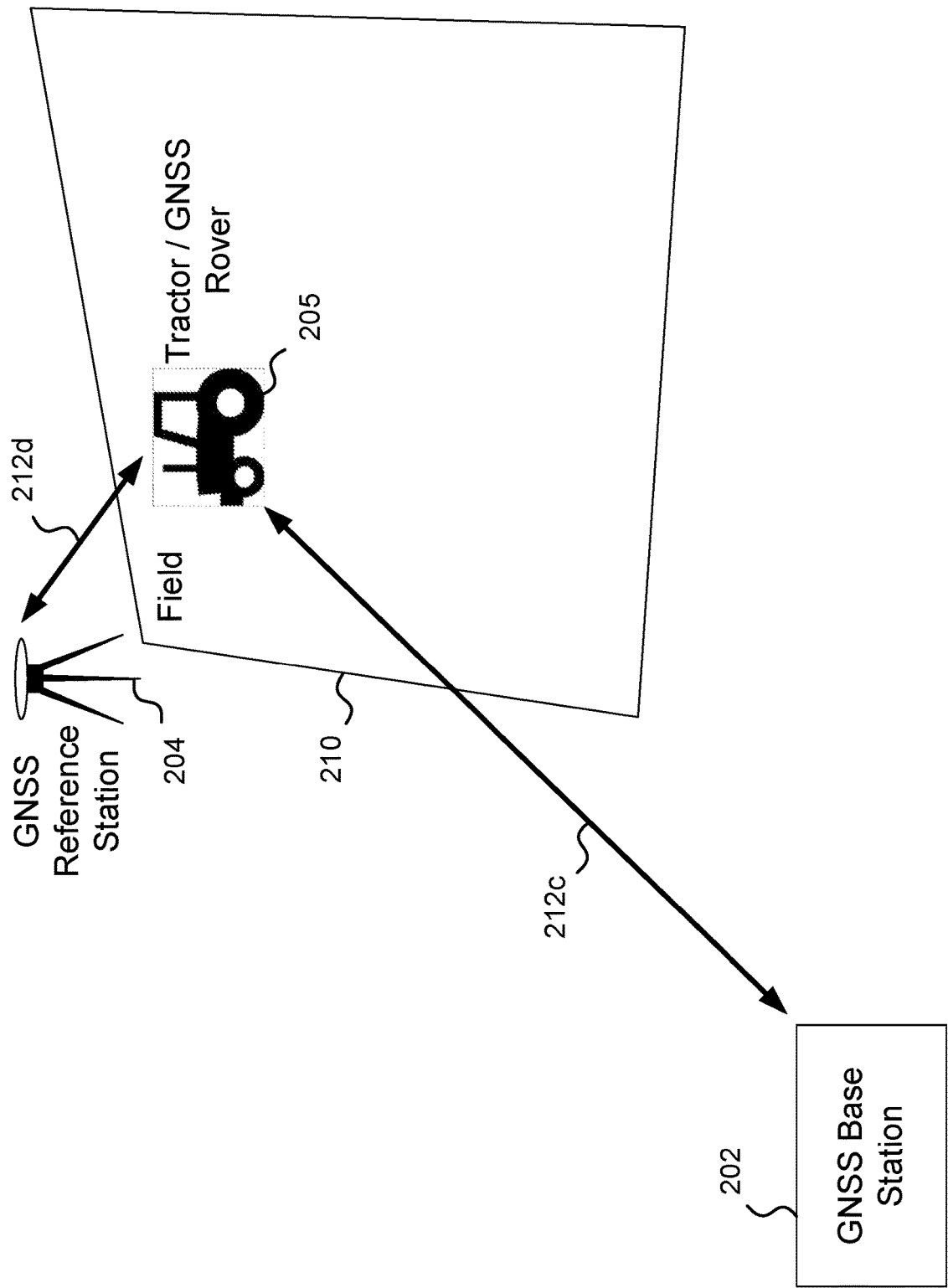

FIGS. 2A-2B are simplified diagrams of a differential GNSS system that can be used to determine corrected positions of a GNSS rover in accordance with some embodiments. In this example, the GNSS rover is integrated with a tractor. The GNSS rover may be mounted on the tractor or a GNSS receiver and associated hardware and software may be integrated with the tractor. The tractor is used merely as an example. In any case, the tractor/GNSS rover 205 is working in a field 210 (e.g., leveling or grading the field). In addition to the tractor/GNSS rover 205, the differential GNSS system also includes a GNSS base station 202, a GNSS reference station 204, and GNSS satellites (not shown). In FIG. 2A, the tractor/GNSS rover 205 is a distance 212a from the GNSS base station 202 and a distance 212b from the GNSS reference station, and in FIG. 2B, the tractor/GNSS rover 205 is a distance 212c from the GNSS base station 202 and a distance 212d from the GNSS reference station 204. It is appreciated that these distances change as the tractor/GNSS rover 205 moves around the field 210.

The GNSS reference station 204 may determine position measurements and the tractor/GNSS rover 205 may use a statistical representation of the position measurements to determine a position correction and corrected position as described above with regard to FIG. 1. In some embodiments, the tractor/GNSS rover 205 may determine a new statistical representation and/or position correction after each position measurement or every N position measurements it receives from the GNSS reference station 204. With each of its own position measurements, the tractor/GNSS rover 205 may use the most recent position correction to determine a corrected position.

In this example, the tractor/GNSS rover 205 is working in a lower portion of the field 210 during a first time period represented by FIG. 2A, and the tractor/GNSS rover 205 is working in an upper portion of the field 210 during a second time period represented by FIG. 2B. During the first time period, the GNSS reference station 204 is arranged at a first location near the lower portion of the field, and during the second time period, the GNSS reference station 204 is arranged at a second location near the upper portion of the field 210.

At each of the locations, different statistical representations of the position measurements obtained by the GNSS reference station 204 are determined. For example, the GNSS reference station 204 may be arranged at the first location and position measurements may be performed for a period of time before a first statistical representation is determined. The period of time may be, for example, a particular length of time or a particular number of position measurements. After the tractor/GNSS rover 205 finishes working in the lower half of the field 210, the GNSS reference station 204 may be arranged at the second location and position measurements may be performed for a period of time before a second statistical representation is determined. The second statistical representation is determined using the position measurements performed while the GNSS reference station 204 is arranged at the second location. The GNSS reference station 204 may be moved because minimizing distances 212b and 212d between the tractor/GNSS rover 205 and the GNSS reference station 204 can provide more accurate position corrections.

Figure 3:
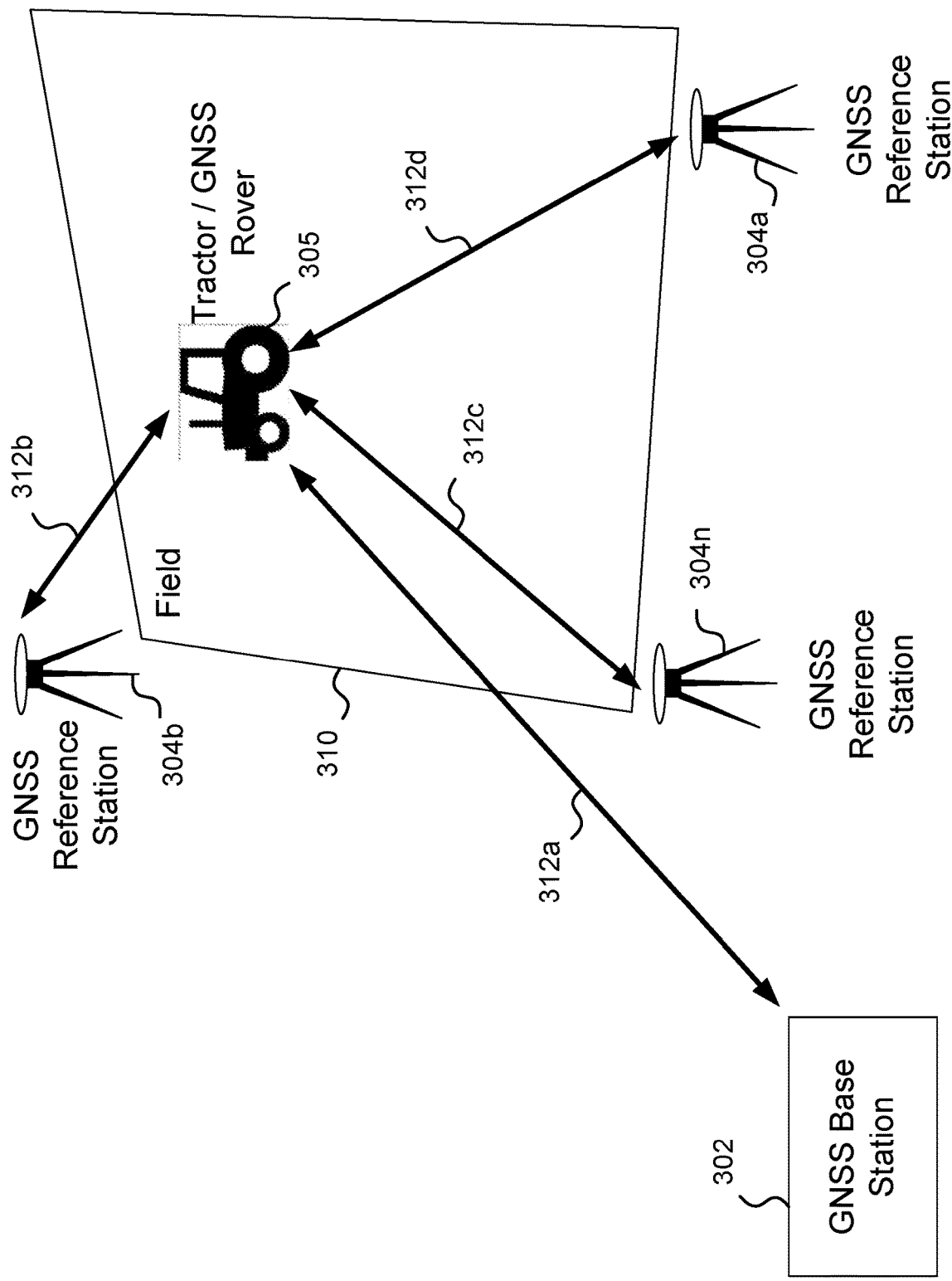

FIG. 3 is a simplified diagram of a differential GNSS system that can be used to determine corrected positions of a GNSS rover in accordance with some embodiments. In this example the system includes a GNSS base station 302, a tractor/GNSS rover 305, GNSS reference stations 304a, 304b, 304n, and GNSS satellites (not shown). The GNSS reference stations 304a, 304b, 304n represent any number of a plurality of reference stations (including two reference stations). The GNSS reference stations are arranged at different locations around field 310.

In this example, each of the GNSS reference stations 304a, 304b, 304n may determine position measurements. A separate statistical representation may be determined for each of the reference stations 304a, 304b, 304n in a manner similar to that described above for a single reference station. The tractor/GNSS rover 305 may use the statistical representations to determine position corrections based on the measurements from each of the GNSS reference stations 304a, 304b, 304n. As an example, in some embodiments a GNSS rover may determine a corrected position (Corrected_Position) based on its own position (Rover_Position) using the equation:

$$\text{Corrected\_Position} = \text{Rover\_Position} - (PC_{Sum}/N) \quad (5)$$

where $PC_{Sum}$ is the sum of the position corrections from each of N GNSS reference stations.

In some embodiments, scaling factors may be used with multiple reference stations in a manner similar to that described above with regard to FIG. 1. As an example, in an embodiment the scaling factors may be determined for each of the N GNSS reference stations using the following equation:

$$\text{Scaling\_Factor}_i = (\text{Distance}_{Sum} - \text{Distance}_{R \to RSi}) / (\text{Distance}_{Sum} * N) \quad (6)$$

where $\text{Scaling\_Factor}_i$ is the scaling factor for GNSS reference station $RS_i$ (i=1, 2, 3, ... N); $\text{Distance}_{R \to RSi}$ is the distance between the GNSS rover and the GNSS reference station $RS_i$; $\text{Distance}_{Sum}$ is the sum of the distances between the GNSS rover and the GNSS base station and the GNSS rover and the GNSS reference stations; and N is the number of GNSS reference stations that are being used.

After determining the scaling factor (Scaling_Factor) for each GNSS reference station, in some embodiment the corrected position of the GNSS rover may be determined using the equation:

$$\text{Corrected\_Position} = \text{Rover\_Position} - \sum_{i=1}^{N} \text{Position\_Correction}_i * \text{Scaling\_Factor}_i \quad (7)$$

In some embodiments, the GNSS rover makes a number of position measurements that may be performed at regular or irregular intervals. For example, the tractor/GNSS rover 305 in FIG. 3 may make a position measurement more or less frequently than every second. In some embodiments, the tractor/GNSS rover 305 may determine a position correction and/or a corrected position for each of its own position measurements. In other embodiments, the tractor/GNSS rover 305 may determine a position correction and/or a corrected position more or less frequently. In an embodiment, for example, the frequency at which the tractor/GNSS rover 305 determines a position correction and/or a corrected position may depend on a frequency that position measurements are received from the GNSS reference stations 304a, 304b, 304n.

The example illustrated in FIG. 3 shows a single GNSS rover and a plurality of GNSS reference stations. It should be appreciated that for each of the embodiments described herein, multiple GNSS rovers working in the same area may use the position measurements from the GNSS reference stations to determine position corrections and corrected positions. Additionally, one or more GNSS rovers may use position measurements from only a portion of the GNSS reference stations in an area. As yet another variation, multiple GNSS rovers may use position measurements from only a single GNSS reference station.

It should also be appreciated that for each of the embodiments described herein, one base station or multiple base stations may be used to generate corrections based on estimated measurement errors. The corrections may be generated using any of a number of known differential GNSS techniques, including DGPS, RTK, networked RTK, precise point positioning (PPP) virtual reference station (VRS), and the like.

Figure 4A:
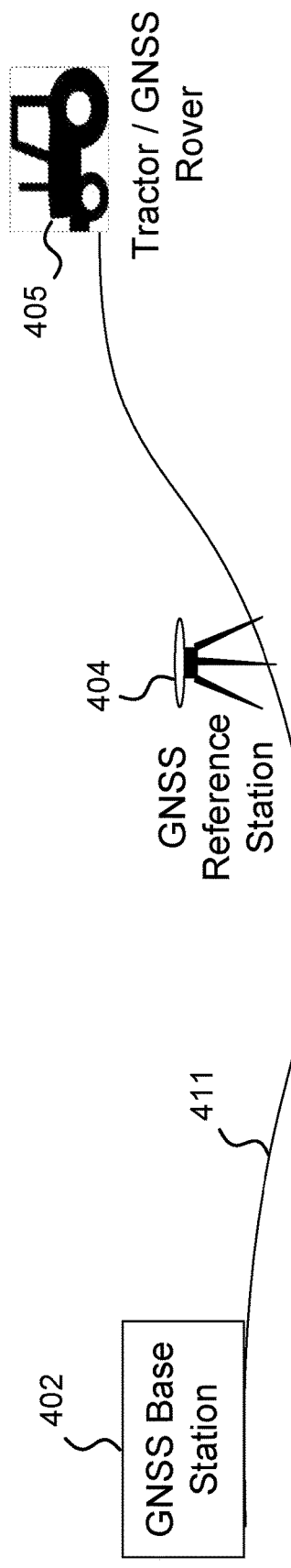
Figure 4B:
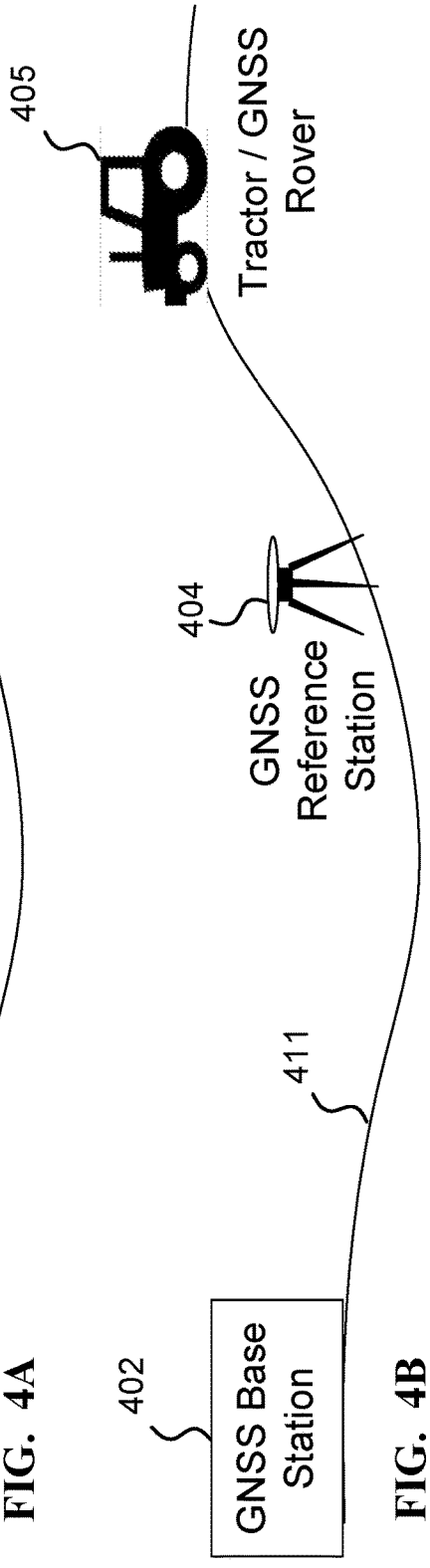
Figure 4C:
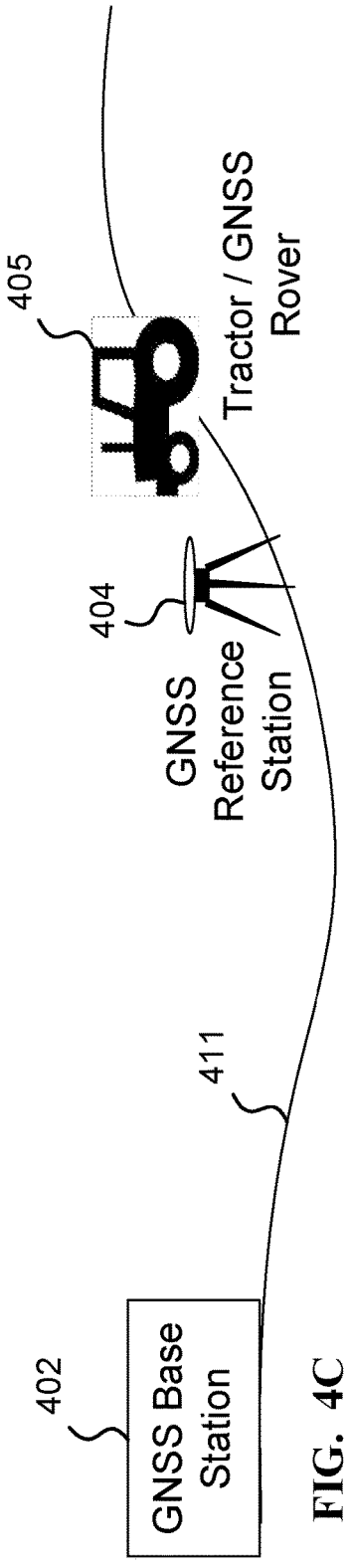

FIGS. 4A-4C are simplified diagrams of a differential GNSS system that can be used to determine corrected positions of GNSS rovers in accordance with some embodiments. These figures show a GNSS base station 402 in a fixed location. Coordinates of the location may be known as described previously. This system also includes a GNSS reference station 404 that is stationary and performing position measurements. Although not shown, the GNSS reference station 404 is mobile and could be moved to keep the distance between itself and a tractor/GNSS rover 405 under some threshold. The tractor/GNSS rover 405 is moving across an area 411 in these figures. This illustrates that the tractor/GNSS rover 405 may be moving while the GNSS reference station 404 is stationary and performing position measurements. As described above, the tractor/GNSS rover 405 may use the position measurements from the GNSS reference station 404 to determine position corrections and corrected positions.

Figure 5A:
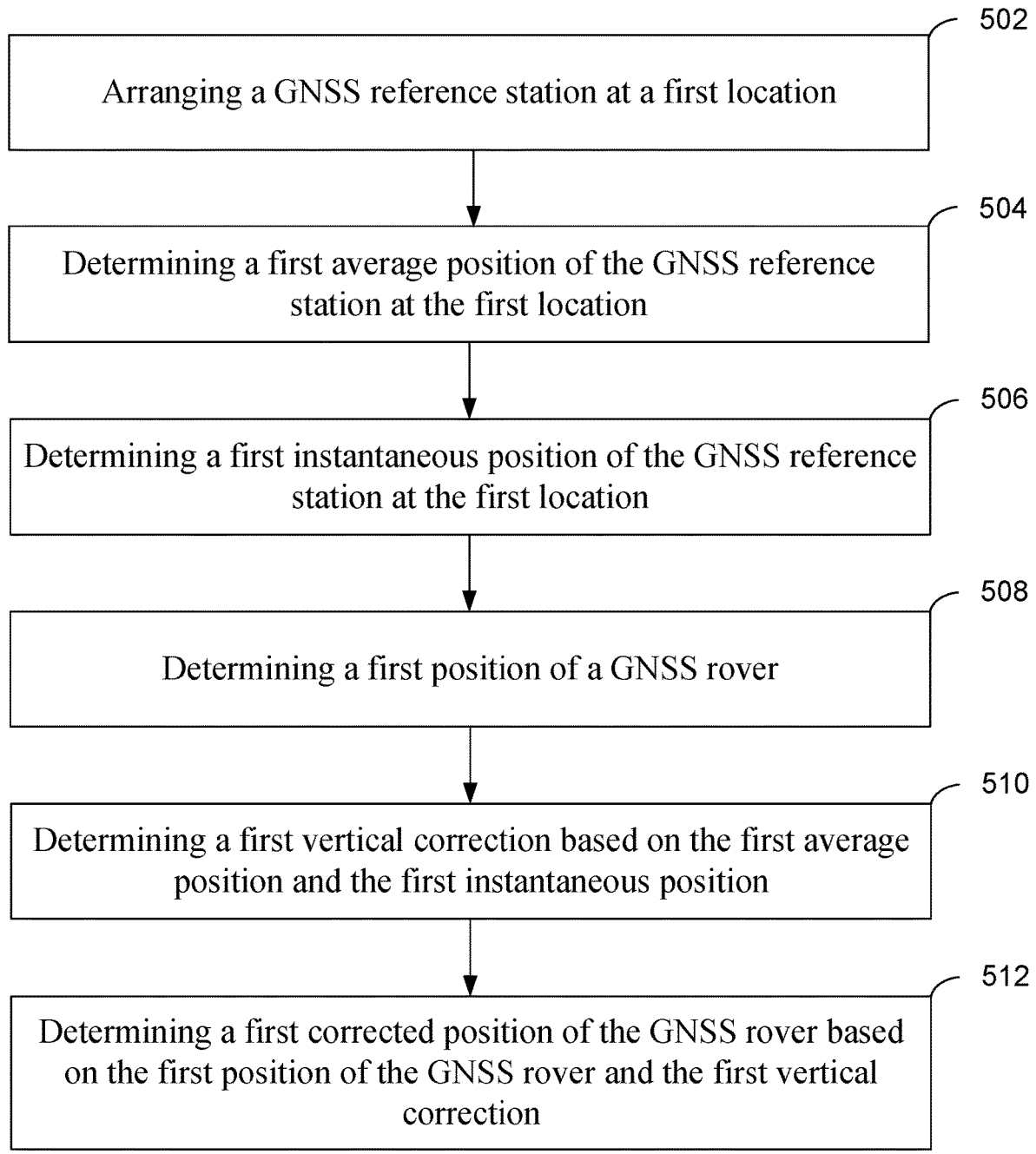
FIGS. 5A-5B, 6, and 7 are flowcharts illustrating methods for determining corrected positions of GNSS rovers in accordance with some embodiments.
Figure 5B:
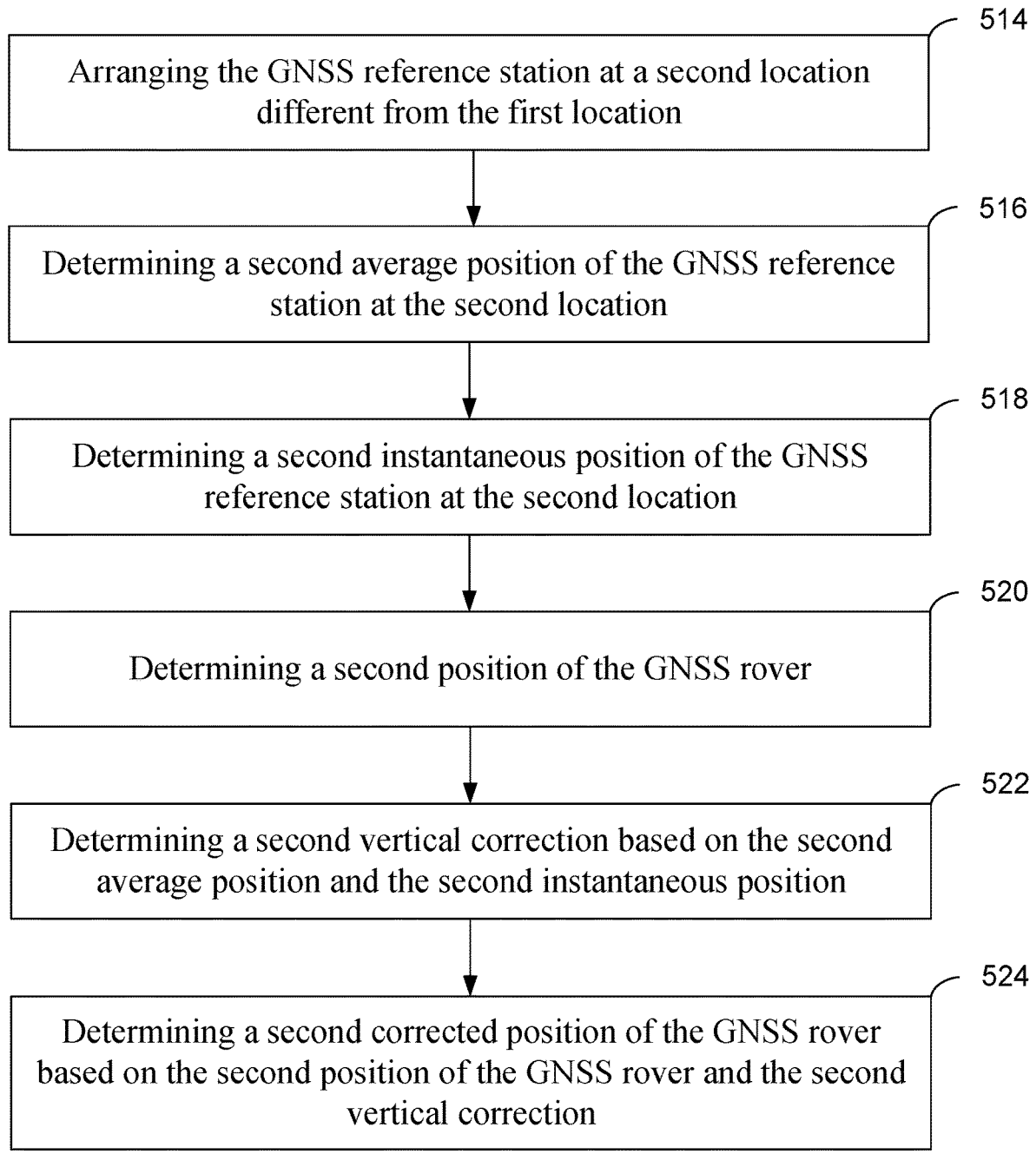

FIGS. 5A-5B are flowcharts illustrating a method for determining corrected positions of a GNSS rover using a GNSS base station and a GNSS reference station in accordance with an embodiment. Each of the GNSS rover, the GNSS base station, and the GNSS reference station are configured for RTK processing techniques in this example. The method is not limited to RTK, however, and in other embodiments, the GNSS rover, the GNSS base station, and the GNSS reference station may be configured for other differential GNSS techniques.

The method includes arranging the GNSS reference station at a first location (502). For example, as illustrated in FIGS. 2A-2B and described above, the first location may be near a first portion of a field where measurements will be performed by the GNSS rover (e.g., lower portion).

The method also includes determining a first average position of the GNSS reference station at the first location (504). The first average position may be determined from a plurality of first position measurements at the first location. The first average position may be determined using RTK corrections received from the GNSS base station and signals received from GNSS satellites. As described previously, the RTK corrections may be generated based on a known location of the GNSS base station.

The method also includes determining a first instantaneous position of the GNSS reference station at the first location (506). The first instantaneous position may be a single position measurement or a number of position measurements determined after a plurality of other position measurements that are used in determining the first average position. Alternatively, the first instantaneous position may be a most recent one or most recent ones of a plurality of position measurements used to determine the first average position. The first instantaneous position may be determined using RTK corrections received from the GNSS base station and signals received from GNSS satellites.

The method also includes determining a first position of the GNSS rover (508). The first position of the GNSS rover may be determined using RTK corrections received from the GNSS base station and signals received from GNSS satellites.

The method also includes determining a first vertical correction based on the first average position and the first instantaneous position (510). The first vertical correction may be a vertical difference between the first average position and the first instantaneous position.

The method also includes determining a first corrected position of the GNSS rover based on the first position of the GNSS rover and the first vertical correction (512). The first corrected position of the GNSS rover may also be based on a scaling factor. In some embodiments, the scaling factor is a function of a first distance between the GNSS rover and the GNSS reference station and a second distance between the GNSS rover and the GNSS base station.

The method also includes arranging the GNSS reference station at a second location different from the first location (514). Referring again to the example illustrated in FIGS. 2A-2B, the second location may be near a second portion of a field where measurements will be performed by the GNSS rover (e.g., upper portion).

The method also includes a number of steps that are similar to steps (504)-(512). These steps will not be described again in detail. These steps include determining a second average position of the GNSS reference station at the second location (516), determining a second instantaneous position of the GNSS reference station at the second location (518), determining a second position of the GNSS rover (520), determining a second vertical correction based on the second average position and the second instantaneous position (522), and determining a second corrected position of the GNSS rover based on the second position of the GNSS rover and the second vertical correction (524).

Figure 6:
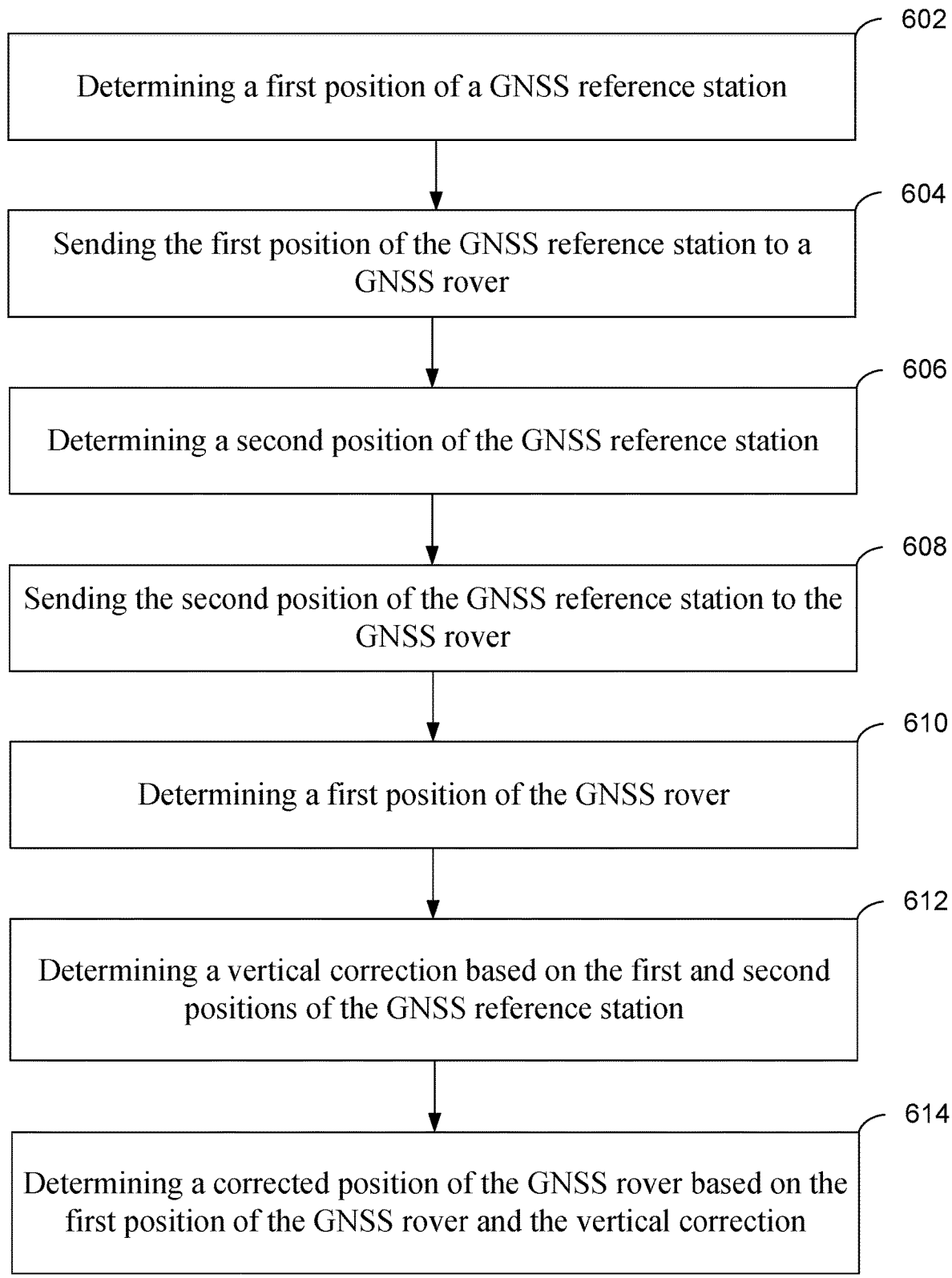

FIG. 6 is a flowchart illustrating a method for determining a corrected position of a GNSS rover using a GNSS base station and a GNSS reference station in accordance with an embodiment. In this example, the GNSS base station may be at a fixed position and the GNSS reference station may be mobile. A first position of the GNSS reference station is determined (602), and the first position of the GNSS reference station is sent to the GNSS rover (604). A second position of the GNSS reference station is determined (606), and the second position of the GNSS reference station is sent to the GNSS rover (608). A first position of the GNSS rover is determined (610), a vertical correction is determined based on the first and second positions of the GNSS reference station (612), and a corrected position of the GNSS rover is determined based on the first position of the GNSS rover and the vertical correction (614). In some embodiments, the GNSS reference station remains stationary while the first and second positions of the GNSS reference station are determined, and the GNSS rover may be moving while the first and second positions of the GNSS reference station are determined.

In some embodiments, the GNSS rover, the GNSS base station, and the GNSS reference station may each be configured for differential processing techniques, and corrections received from the GNSS base station may be differential corrections. In other embodiments, the GNSS rover, the GNSS base station, and the GNSS reference station are each configured for RTK processing techniques, and the corrections received from the GNSS base station are RTK corrections.

The first position of the GNSS reference station determined in step (602) may be combined with other positions of the GNSS reference station to obtain an average position, and the vertical correction determined in step (612) may be a vertical difference between the average position of the GNSS reference station and the second position of the GNSS reference station.

Figure 7:
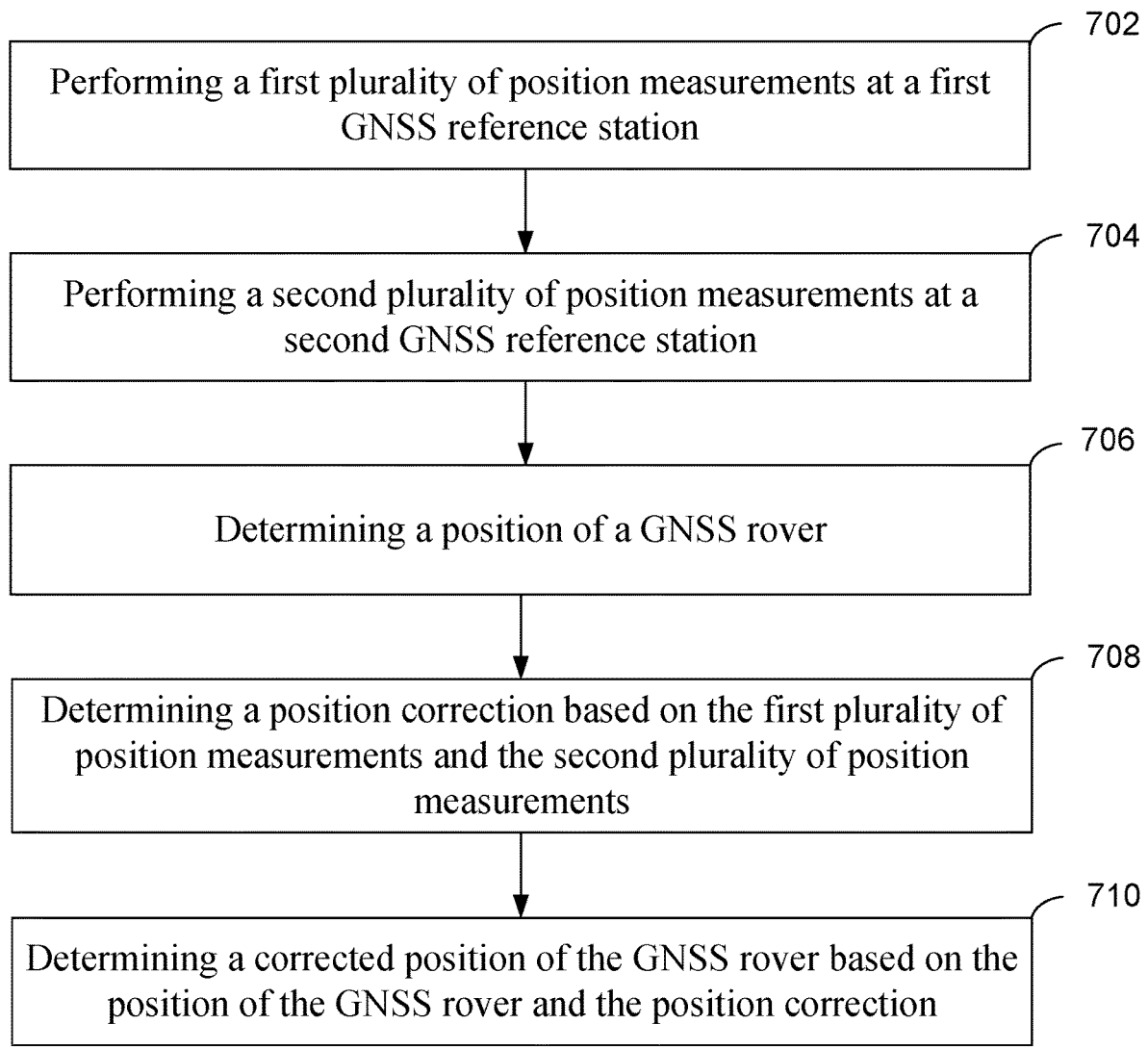

FIG. 7 is a flowchart illustrating a method for determining a corrected position of a GNSS rover using a GNSS base station and a plurality of GNSS references station in accordance with an embodiment. The method includes performing a first plurality of position measurements at a first GNSS reference station (702). The first GNSS reference station is one of the plurality of GNSS reference stations and is arranged at a first location while the first plurality of position measurements are determined. The first plurality of position measurements may be determined using corrections received from the GNSS base station and signals received at the first GNSS reference station from GNSS satellites. The first plurality of position measurements are determined while the first GNSS reference station is stationary.

The method also includes performing a second plurality of position measurements at a second GNSS reference station (704). The second GNSS reference station may be different from the first GNSS reference station. The second GNSS reference station is one of the plurality of GNSS reference stations and is arranged at a second location while the second plurality of position measurements are determined. The second plurality of position measurements may be determined using corrections received from the GNSS base station and signals received at the second GNSS reference station from GNSS satellites. The second plurality of position measurements are determined while the second GNSS reference station is stationary.

The method also includes determining a position of the GNSS rover (706). The position of the GNSS rover may be determined using corrections received from the GNSS base station and signals received at the GNSS rover from GNSS satellites.

The method also includes determining a position correction based on the first plurality of position measurements and the second plurality of position measurements (708). The position correction may be a vertical correction that is determined based on a first difference between a statistical representation of the first plurality of position measurements and an instantaneous position of one of the first plurality of position measurements, and a second difference between a statistical representation of the second plurality of position measurements and an instantaneous position of one of the second plurality of position measurements.

The method also includes determining a corrected position of the GNSS rover based on the position of the GNSS rover and the position correction (710). The position correction may be determined based on a first vertical component of the first plurality of position measurements and a second vertical component of the second plurality of position measurements. The corrected position may be based on a scaling factor that is a function of a first distance between the GNSS rover and the first GNSS reference station, a second distance between the GNSS rover and the second GNSS reference station, and a third distance between the GNSS rover and the GNSS base station.

In some embodiments, the first and second plurality of position measurements may be determined one at a time and individually sent to the GNSS rover, and the position correction and the corrected position may be determined by the GNSS rover.

In this example, the corrections received from the GNSS base station may be RTK corrections or corrections based on other differential GNSS techniques.

Some embodiments also include determining a third plurality of position measurements of a third GNSS reference station, where the third GNSS reference station is one of the plurality of GNSS reference stations and is arranged at a third location while the third plurality of position measurements are determined. The third plurality of position measurements may be determined using corrections received from the GNSS base station and signals received at the third GNSS reference station from GNSS satellites. The third plurality of position measurements are determined while the third GNSS reference station is stationary. In this example, the position correction is determined based on the first plurality of position measurements, the second plurality of position measurements, and the third plurality of position measurements. Additional GNSS reference stations may be used to provide additional position measurements in a similar manner.

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for determining corrected positions of a global navigation satellite system (GNSS) rover using a GNSS base station and a plurality of GNSS reference stations, the method comprising:

performing a first plurality of position measurements at a first GNSS reference station, the first GNSS reference station being one of the plurality of GNSS reference stations, the first GNSS reference station arranged at a first location while the first plurality of position measurements are determined, the first plurality of position measurements determined using corrections received from the GNSS base station and signals received at the first GNSS reference station from GNSS satellites, wherein the first plurality of position measurements are determined while the first GNSS reference station is stationary;

performing a second plurality of position measurements at a second GNSS reference station different from the first GNSS reference station, the second GNSS reference station being one of the plurality of GNSS reference stations, the second GNSS reference station arranged at a second location while the second plurality of position measurements are determined, the second plurality of position measurements determined using corrections received from the GNSS base station and signals received at the second GNSS reference station from GNSS satellites, wherein the second plurality of position measurements are determined while the second GNSS reference station is stationary;

determining a position of the GNSS rover using corrections received from the GNSS base station and signals received at the GNSS rover from GNSS satellites;

determining a position correction based on the first plurality of position measurements and the second plurality of position measurements;

determining a corrected position of the GNSS rover based on the position of the GNSS rover and the position correction.

2. The method of claim 1 wherein the position correction is a vertical correction that is determined based on a first difference between a statistical representation of the first plurality of position measurements and an instantaneous position of one of the first plurality of position measurements, and a second difference between a statistical representation of the second plurality of position measurements and an instantaneous position of one of the second plurality of position measurements.

3. The method of claim 1 wherein the corrections received from the GNSS base station are real-time kinematic (RTK) corrections.

4. The method of claim 1 wherein the first plurality of position measurements are determined one at a time and individually sent to the GNSS rover, the second plurality of position measurements are determined one at a time and individually sent to the GNSS rover, and the position correction and the corrected position are determined by the GNSS rover.

5. The method of claim 1 wherein the corrected position of the GNSS rover is also based on a scaling factor that is a function of a first distance between the GNSS rover and the first GNSS reference station, a second distance between the GNSS rover and the second GNSS reference station, and a third distance between the GNSS rover and the GNSS base station.

6. The method of claim 1 further comprising:

determining a third plurality of position measurements of a third GNSS reference station, the third GNSS reference station being one of the plurality of GNSS reference stations, the third GNSS reference station arranged at a third location while the third plurality of position measurements are determined, the third plurality of position measurements determined using corrections received from the GNSS base station and signals received at the third GNSS reference station from GNSS satellites, wherein the third plurality of position measurements are determined while the third GNSS reference station is stationary, and wherein the position correction is determined based on the first plurality of position measurements, the second plurality of position measurements, and the third plurality of position measurements.

7. The method of claim 1 wherein the position correction is determined based on a first vertical component of the first plurality of position measurements and a second vertical component of the second plurality of position measurements.

* * * * *